Aug. 16, 1932.  M. PANITZSCH  1,872,171

PUSH PIN

Filed Oct. 22, 1931

Witness:
Victor Siljander

Inventor
Martin Panitzsch
By Otto M. Wernich
Atty

Patented Aug. 16, 1932

1,872,171

UNITED STATES PATENT OFFICE

MARTIN PANITZSCH, OF FOREST PARK, ILLINOIS

PUSH PIN

Application filed October 22, 1931. Serial No. 570,381.

The invention relates to a supporting device for holding an article such as a curtain, picture, shield or other device relatively to a wall or other structure. The device has among its various objects the provision of a structure having means for securing the device to a wall by being screwed or pushed into said wall and which has a fastener associated therewith which is capable of being arranged in any one of several positions of the compass to thereby arrange the fastener to permit it to be connected with an article, which it is desired to hold or support by means of the device.

Another object of the invention is to provide a device of the above mentioned character with means whereby association of the device with a wall is facilitated and which has a portion providing a grip whereby removal of the device may be readily accomplished when this is found necessary or desirable.

The invention has also as an object the provision of a member having a screw or pin projecting from one face thereof to provide means for securing the device in position, the member having an annular groove provided therein and a knob extending therefrom, the former providing means for the reception of a ring having a fastener connected therewith, the knob providing means for gripping the device to effect disconnection of the device from a wall and provide means which may be employed to have pressure applied thereto to drive the pin or screw into a wall.

It is an object of the invention to provide a connection between the ring and the fastener which connection will allow the fastener to assume any one of several positions relatively to the ring with the ring arranged in any one of several positions relatively to the member having the pin.

The invention has these and other objects, all of which will be explained in detail and more readily understood when read in conjunction with the accompanying drawing which illustrates one arrangement which may be employed to accomplish the various advantages hereinabove enumerated, it being manifest, however, that changes and modifications may be resorted to without departing from the spirit of the invention as expressed in the appended claims forming a part hereof.

Figure 1:
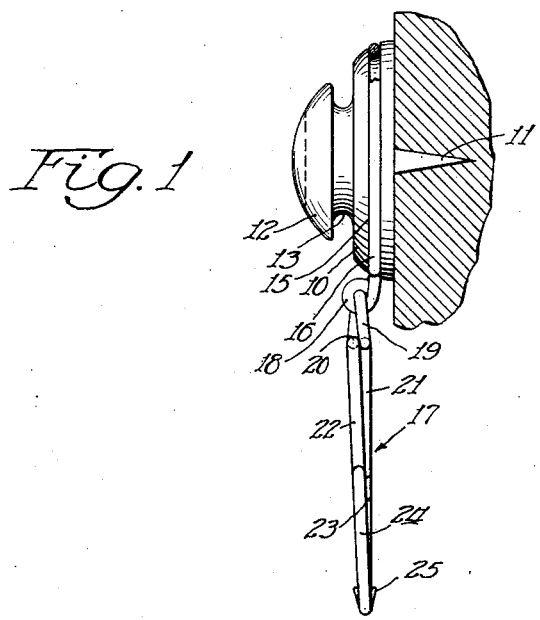
Figure 2:
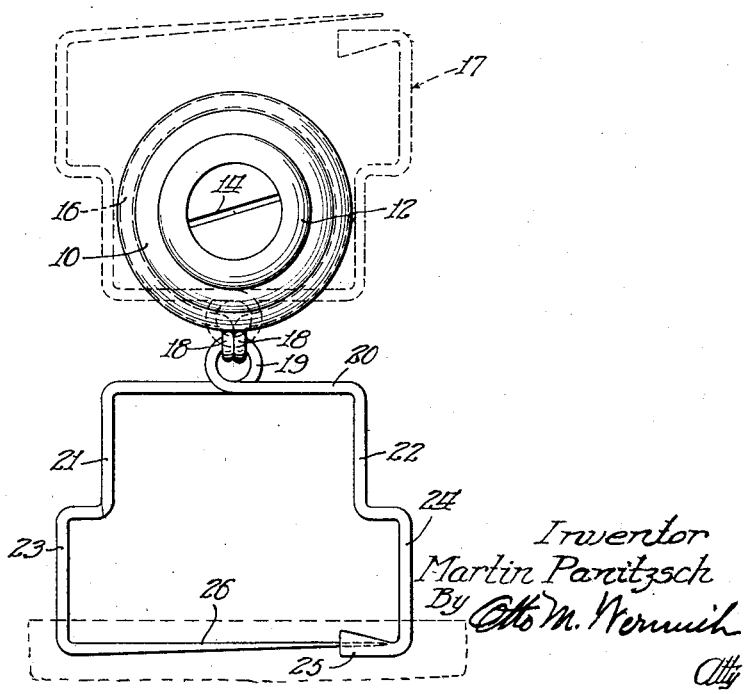

In the drawing, Fig. 1 is a side view of a device embodying the invention showing same applied to a wall, a certain portion being shown in section for the purpose of illustration;

Fig. 2 is a front view of the device shown in Fig. 1.

The embodiment of the invention illustrated in the drawing contemplates the utilization of a body member 10 which has a pin or screw 11 projecting from one face thereof, the latter being adapted to be driven into a wall or other structure to secure the body member 10 and its associated elements relatively to the wall. The body member 10 is provided with a head or knob 12 and a neck portion 13. The head may be slotted as indicated at 14 for the reception of a screw driver should this instrument be employed to effect association of the device with a wall. It will be noted that the knob or head 12 is rounded so that the element 11 may be readily pushed into a wall or other structure when the element 11 is in the form of a pin. The neck portion 13 facilitates gripping of the head 12 when it is desired to separate the structure from a wall.

The body member 10 also has an annular groove 15 provided therein for the reception of a ring 16, the latter being rotatably arranged in the groove and has a fastener such as that generally designated 17 secured thereto. The ring 15 is of a split character as shown in Fig. 2 and the ends thereof are formed to provide eyelets such as 18 which cooperate with an eyelet 19 formed in the fastener or pin 17 to provide a link or connection between these ends of the ring and said pin or fastener. Since the pin is secured to the ring and the ring is rotatable in said groove 15 it is evident that said fastener 17 may be arranged in any one of several points of the compass and thus be located so that association thereof with another element may be facilitated.

The pin or fastener 17 may be of the type shown in the drawing which is formed to provide the portion 20, the parallel portions 21 and 22 and the offset portions 23 and 24, the latter being formed as at 25 to provide a seat for the pointed end of the element 26 which is an extension of the portion 21. It may be here stated that the space between the portions 21 and 22 is such that it will allow the fastener 17 to be arranged in the dotted line position thereof shown in Fig. 2 and be adjusted to other positions of the compass when arranged in this last mentioned manner by virtue of the fact that the ring 16 is rotatable in the groove 15 of the member 10.

From the foregoing description of the structure, it is manifest that a simple device is provided which may be readily associated with and separated from a wall or other supporting structure which includes a fastener such as 17 and involves a construction which will allow the fastener to be arranged in any one of several positions of the compass to thereby arrange the fastener so that it may either support or hold an article such as, for instance, a shield or curtain with the fastener arranged in any one of its angular adjusted positions.

Having thus described the invention, what I claim as new and desire to cover by Letters Patent is:

1. In a device of the kind described, the combination of a disc-like body member having a holding element extending therefrom, an annular element connected for rotation about a line defining the axis of said body member, and a fastener connected to said annular element.

2. In a device of the kind described, the combination of a disc-like body member having a holding element extending from one face thereof, an annular element rotatably connected with said body member, and a fastener connected for movement with respect to said annular element.

3. In a device of the kind described, the combination of a body member, a holding element arranged axially of said body member extending therefrom, an annular element rotatably connected with said body member and being rotatable about said axis, and a fastener connected to said annular element, said body member having a grip portion.

4. A device of the kind described comprised of a body member having a fastening device extending therefrom, said body member having an annular groove, a ring mounted in said groove, a fastener connected with said ring, said body member having a neck portion and a head providing a grip portion.

5. A device of the kind described comprised of a body member having a fastening device extending therefrom, said body member having an annular groove, a split ring rotatably mounted in said groove, a fastener connected with said ring, the ends of said ring and said fastener being formed to provide elements of a connection between said ring and fastener.

6. In a device of the kind described comprised of a disc-like body member having a fastening device arranged axially of said disc-like member, a ring mounted for rotation upon said disc-like body member, a fastener connected to said ring, a member providing a gripping element, and a neck connecting said gripping element and body portion.

7. In a device of the kind described comprised of a disc-like body member having a fastening device arranged axially of said disc-like member, a ring mounted for rotation upon said disc-like body member, a fastener connected to said ring for movement relatively to said ring, a member providing a gripping element, and a neck connecting said gripping element and body portion.

In witness whereof, I hereunto subscribe my name this 10th day of October, A. D. 1931.

MARTIN PANITZSCH.